Dec. 9, 1952 R. A. YOHPE 2,621,017
PACKED VALVE
Filed Oct. 22, 1947
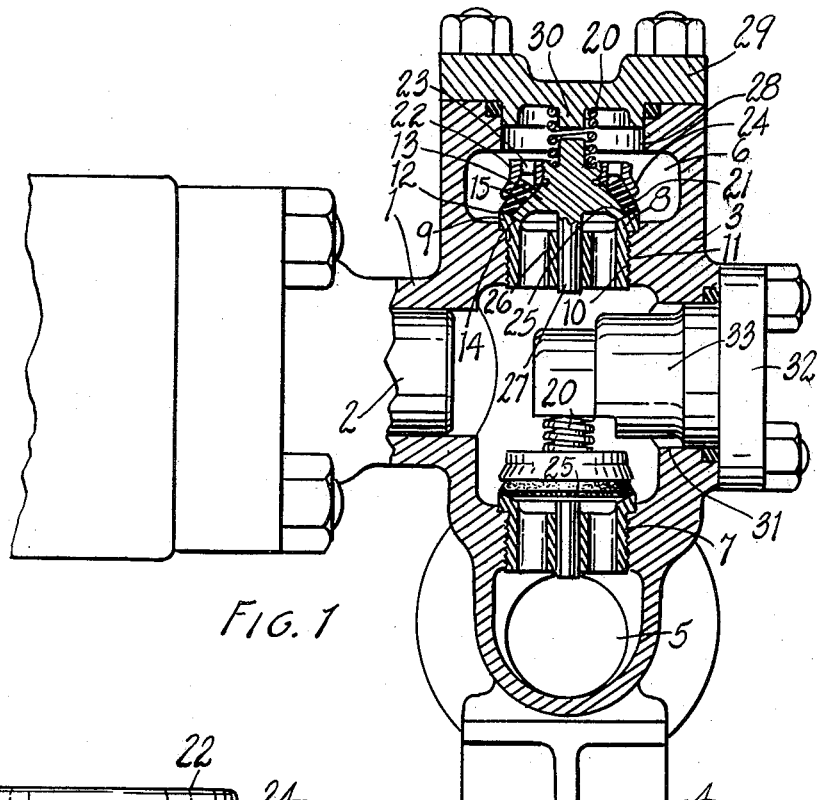
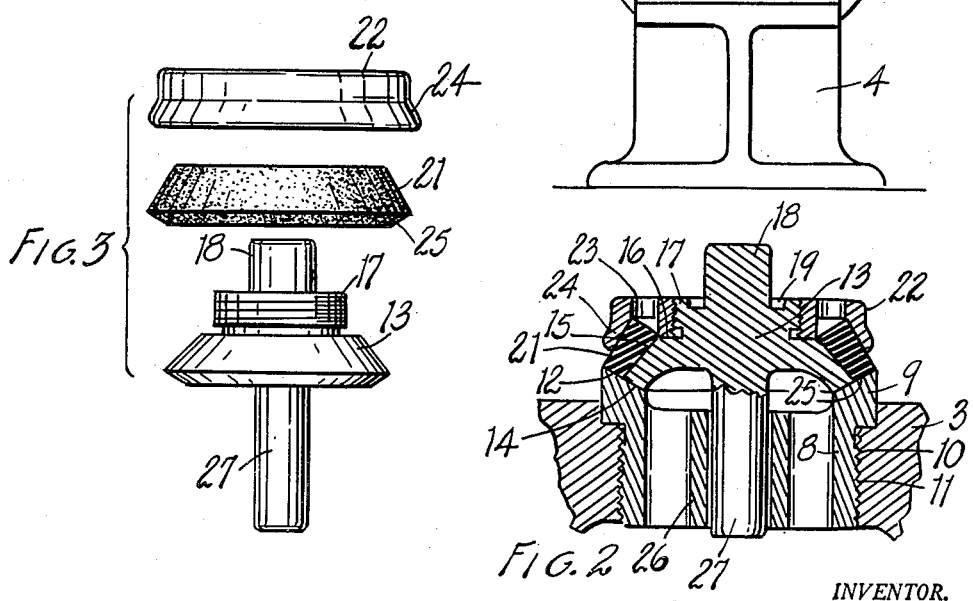
INVENTOR.
Reinhard A. Yohpe
BY
Attorney.

Patented Dec. 9, 1952

2,621,017

UNITED STATES PATENT OFFICE 2,621,017

PACKED VALVE

Reinhard A. Yohpe, Battle Creek, Mich., assignor to Union Steam Pump Company, Battle Creek, Mich., a corporation of Michigan Application October 22, 1947, Serial No. 781,419

4 Claims. (Cl. 251—144)

This invention relates to improvements in a packed valve.

The main objects of this invention are:

First, to provide a valve well adapted for use as a check valve or pump valve under conditions where it is subject to high pressures.

Second, to provide an improved valve for high pressure service generally and for low or high pressure service involving fluids which are abrasive or contain abrasive particles or which are corrosive or for other conditions under which effectiveness and maintenance of seating surfaces are problems with conventional valves.

Third, to provide a valve having a combination of relatively non-resilient and resilient seat engaging members, the pressure load on the valve being carried by the non-resilient member and the resilient member being so disposed and secured that it will be automatically adjusted to compensate for wear by the action of the liquid on the member or the seat.

Fourth, to provide a valve having a combination of non-resilient and resilient seat engaging members, the resilient seat engaging member being positioned so that it is subject to the fluid pressure which tends to force it into sealing engagement with the seat and is at the same time effectively supported so that it is not permanently distorted by such pressure.

Fifth, to provide a structure embodying the above advantages which is simple and economical in its parts and very durable in use.

Objects relating to details and economies of the invention will appear from the description to follow. The invention is defined and pointed out in the claims.

A preferred embodiment of the invention is illustrated in the accompanying drawing, in which:

Fig. 1 is a fragmentary view partially in vertical section of a pump structure embodying the invention.

Fig. 2 is an enlarged fragmentary view partially in section illustrating structural details of one of the valves.

Fig. 3 is an exploded side elevational view of the valve.

In the accompanying drawing I have illustrated the invention as embodied in a triplex plunger pump used for a variety of services including the pumping of cement and mud slurries, plastics, oil, water and acid, all at pressures ranging from a few hundred to several thousand pounds per sq. in. While the valve is particularly designed for high pressure pumping service on ordinary liquids, and regardless of pressure for liquids which contain abrasive particles or which are corrosive, it may be advantageously used in a wide range of installations in which maintenance of effective sealing is important and difficult with conventional valves and whether in pumps or other hydraulic devices using valves acting as check valves.

In the accompanying drawing, I represents the cylinder of a pump and 2 the plunger. The cylinder head 3 is supported on the pedestal 4 and is chambered to constitute a valve casing having an inlet chamber 5 and a discharge chamber 6.

The inlet valve assembly is designated by the numeral 7 and the outlet valve assembly by the numeral 8. As these valve assemblies are the same a description of one will suffice and we will therefore describe the outlet valve 8 as is shown in section.

The valve of the invention comprises a valve seat member 9 threaded at 10 to be threaded into a suitable bore 11 in the cylinder head. While the valve seat is shown screwed into cylinder head it may be secured by other means such as by a taper or press fit or the seat may be formed directly on the cylinder head. This valve seat member has an annular inwardly inclined valve seat 12, the seat being of rigid wear resisting material. The valve member 13 is provided with an annular non-resilient seating face 14 coacting with the inner portion of the valve seat—that is, the valve seat is of substantially greater radial width than the seating face of the valve member which seats in the inner portion of the valve seat.

The valve member has a conical peripheral portion 15 extending upwardly from its seating face and is provided with a shoulder 16 at the upper end of the conical portion 15. Above the shoulder, the valve is provided with a threaded portion 17 and at its upper end is provided with a spring supporting stud 18. This stud is surrounded by an annular groove 19 constituting a seat for the biasing spring 20.

The conical packing 21 is of somewhat flexible resilient material and is internally conical to supportingly embrace the conical portion 15 of the valve member. It is also preferably externally conical, being however downwardly tapered.

The packing clamping or retaining ring 22 is threaded upon the threaded portion of the valve member to seat against the shoulder 16. The retaining member is provided with openings 23 which permit liquid pressure to act freely upon the upper surface of the packing 21 and which are adapted to receive a spanner wrench. The retaining member has an internally conical flange 24 which embraces the packing, this flange however terminating in substantially spaced relation to the inner or lower end of the packing so that while the packing is clamped upon the valve member it presents a substantial peripheral surface subject to the pressure of the fluid that is being handled.

The packing has a seating face 25 disposed at an angle to seat upon the valve seating face 14 at the outer side of the seating face of the valve member 13. Thus arranged, the packing member not only sealingly engages the valve seat normally when the valve is closed but is forced into engagement therewith by the pressure of the fluid acting on the upper surface of the packing and one that portion of the outer conical surface of the packing just above the seating surface 15. The valve seat member is provided with a stem guide 26 while the valve has a coacting stem 27 but other methods of guiding the valve may be employed.

While the seating surfaces are preferably inclined annular as shown, they may also be of other shapes such as spherical annular or they may be flat surfaces or a combination of different surfaces may be used for the valve member and the packing member with corresponding co-acting surfaces on the valve seat. The shoulder on the valve member prevents the mechanic assembling the valve from unduly distorting the packing or putting undue pressure thereon.

The cylinder head is provided with an opening 28 aligned with the valve 8 and provided with a closure 29, the opening 28 being of such dimension that the valve can be withdrawn therethrough. The closure is provided with a stud 30 constituting a support for the upper end of the spring 20. The cylinder head is provided with an opening 31 through which access may be had to the valve assembly 7. This opening 31 is provided with a closure 32 having an extension 33 which constitutes a support for the biasing spring 20 of the inlet valve.

The essential features of this invention are that the packing member is not mechanically rigidly secured with respect to the valve but is secured in such a way as to permit hydraulic pressure to force the packing member into sealing engagement with its co-acting seat on the seating member and to continue to force the member into proper position for sealing action as wear or deterioration takes place on the co-acting seating surfaces of these members, and that the packing member is constrained in such a way that it cannot be greatly distorted or forced out of shape. As wear takes place on the co-acting surfaces of the packing member and the seating member hydraulic pressure acting on the upper surface of the packing member forces the member downward, thus automatically compensating for wear of these surfaces, the packing member continues in service so long as a sufficient portion of the packing member remains between the retaining member 22 and the valve member 13 to properly position and restrain the packing member. The downward tapered section of the packing member with the co-acting surfaces of the retaining and valve members causes a compressing action of the packing member between the retaining and valve members and the packing member is thus sufficiently secured in proper position as it is forced downward to compensate for wear. The retention of the packing member between the valve and retaining members with only a small portion of the packing member exposed prevents serious distortion of the packing member and sealing efficiency is thus maintained until the member is worn out. This retention also assures that the complete valve can always be easily removed through the hole 28 in the top of the cylinder even though the bore of the hole is only slightly larger than the largest original diameter of the packing member.

I have illustrated and described the invention in a highly practical embodiment thereof. I have not attempted to illustrate other adaptations as it is believed that this disclosure made will enable those skilled in the art to embody or adapt the same as may be desired.

Having thus described my invention, what I claim as new and desire to secure by Letters Patent is:

1. A valve comprising a valve seat member having an annular inwardly inclined rigid valve seat and provided with a central stem guide, a valve member having a stem coacting with said guide and provided with an annular inwardly inclined rigid seating face of a radial width substantially less than the radial width of the valve seat and adapted to seat on the inner portion thereof, the valve member having a conical surface extending upwardly and inwardly from its seating face and having a shoulder at the top of said conical surface and a threaded portion above said shoulder, an annular resilient deformable packing embracing and supported by said conical surface of said valve member, the lower end of the packing being disposed at an angle corresponding to the angle of the valve seat and constituting a seating face coacting with the valve seat radially outwardly from the valve member seating face, and a clamping ring for said packing threaded upon said valve member to abut the said shoulder thereof and having a conical flange embracing the upper portion of the packing, said flange having an inner surface converging downwardly toward said conical surface on said valve member but terminating in substantially spaced relation to the lower outside edge thereof, the surface of the packing between the lower edge of said flange and said valve seat being exposed to pressure of the fluid to facilitate forcing the packing into engagement with the valve seat, said clamping ring having apertures in the top thereof opening to the upper end of said packing whereby fluid pressure on said valve member will act through said apertures to urge said packing downwardly into the contracting space between said conical flange and conical surface.

2. A valve comprising a valve seat member having an annular inwardly inclined rigid valve seat, a valve member provided with an annular inwardly inclined rigid seating face of a radial width substantially less than the radial width of the valve seat and adapted to seat on the inner portion thereof, the valve member having a conical surface extending upwardly and inwardly from its seating face, an annular resilient deformable packing embracing and supported by said conical surface of said valve member, the lower end of the packing being disposed at an angle corresponding to the angle of the valve seat and constituting a seating face coacting with the valve seat radially outwardly from the valve member seating face, and a clamping ring for said packing threaded upon said valve member and having a conical flange embracing the upper portion of the packing, said flange having an inner surface converging downwardly toward said conical surface on said valve member but terminating in substantially spaced relation to the lower outside edge thereof, the surface of the packing between the lower edge of said flange and said valve seat being exposed to pressure of the fluid to facilitate forcing the packing into engagement with said valve seat, said clamping ring having apertures in the top thereof opening to the upper end of said packing whereby fluid pressure on said valve member will act through said apertures to urge said packing downwardly into the contracting space between said conical flange and conical surface.

3. A valve comprising a valve seat member having an annular inwardly inclined rigid valve seat, a valve member provided with an annular inwardly inclined rigid seating face of a radial width substantially less than the radial width of the valve seat and adapted to seat on the inner portion thereof, the valve member having a conical surface extending upwardly and inwardly from its seating face, an annular resilient and internally and externally truncated conical deformable packing of downwardly tapering section embracing and supported by said conical surface of said valve member, the lower end of the packing being disposed at an angle corresponding to the angle of the valve seat and constituting a seating face coacting with the valve seat radially outwardly from the valve member seating face, and a clamping ring for said packing threaded upon said valve member and having a conical flange embracing the upper portion of the packing, said flange having an inner surface converting downwardly toward said conical surface on said valve member but terminating in substantially spaced relation to the lower outside edge thereof, the surface of the packing between the lower edge of said flange and said valve seat being exposed to pressure of the fluid to facilitate forcing the packing into engagement with the valve seat, the space between said ring and said valve member being vented to the top of said valve member whereby fluid pressure on said valve member will act on the top of said packing to wedgingly urge said packing toward said valve seat.

4. A valve comprising a valve seat member, a valve member, and a sealing member, the valve seat member having a seating surface to coact with a seating surface of the valve member and with a seating surface of the sealing member, the seating surface for the sealing member being outside of the seating surface for the valve member, the sealing member being so secured and confined to the valve member that the hydraulic pressure load on the valve member will be supported by the seating surface of the valve member and its coacting seating surface of the valve seat and sealing being accomplished by the seating surface of the sealing member and its coacting seating surface of the valve seat, the sealing member being of annular shape and wedge shaped in radial section, said valve member being provided with means conformed to provide an annular recess wedge shaped in section to receive and guide the sealing member with wedging action towards its seating surface on the valve seat member by hydraulic pressure to compensate for wear of the coacting seating surfaces of sealing and valve seat members.

REINHARD A. YOHPE.

REFERENCES CITED

The following references are of record in the file of this patent:

UNITED STATES PATENTS

| Number | Name | Date |
|---|---|---|
| 1,409,393 | Monsarrat | Mar. 14, 1922 |
| 1,654,772 | Akeyson | Jan. 31, 1928 |
| 1,716,896 | Miller | June 11, 1929 |
| 1,844,159 | Hamer | Feb. 9, 1932 |
| 1,963,685 | Shimer | June 9, 1934 |
| 2,329,576 | Anderson | Sept. 14, 1943 |
| 2,521,314 | Therolf | Sept. 5, 1950 |